United States Patent [19]

Balcar et al.

[11] Patent Number: 5,462,570
[45] Date of Patent: Oct. 31, 1995

[54] PROCESS FOR PRODUCING AN ENVIRONMENTALLY ACCEPTABLE ABRASIVE PRODUCT FROM HAZARDOUS WASTES

[75] Inventors: Gerald P. Balcar, Newfoundland, N.J.; Anurag Dwivedi, Corning, N.Y.

[73] Assignee: Dunkirk International Glass and Ceramics Corporation, West Milford, N.J.

[21] Appl. No.: 131,543

[22] Filed: Oct. 5, 1993

Related U.S. Application Data

[62] Division of Ser. No. 9,225, Jan. 26, 1993, Pat. No. 5,273,566.

[51] Int. Cl.$^6$ .................................................. C03B 1/00
[52] U.S. Cl. .................... 65/17.1; 65/27; 65/21.2; 65/134.8; 65/141; 588/252; 588/256; 51/308; 501/155; 501/31
[58] Field of Search .................... 588/252, 256; 65/141, 18.2, 17, 27, 134, 21.1, 21.2, 17.1, 134.8; 241/1; 51/308; 501/31, 155

[56] References Cited

U.S. PATENT DOCUMENTS

| | | | |
|---|---|---|---|
| 3,631,131 | 12/1971 | Kopko | 501/155 |
| 3,928,515 | 12/1975 | Richmond et al. | |
| 4,695,447 | 9/1987 | Schultz | |
| 4,751,208 | 6/1988 | Aoki et al. | |
| 4,806,268 | 2/1989 | Kiss | 501/62 |
| 4,872,993 | 10/1989 | Harrison | |
| 4,944,785 | 7/1990 | Sorg et al. | |
| 4,956,158 | 9/1990 | Nguyen | 501/155 |
| 4,977,837 | 12/1990 | Roos et al. | |
| 5,009,511 | 4/1991 | Sarko et al. | |
| 5,022,897 | 6/1991 | Balcar et al. | |
| 5,035,735 | 6/1991 | Pieper et al. | |
| 5,067,978 | 11/1991 | Fowler | |
| 5,128,004 | 7/1992 | Nevels | |
| 5,164,174 | 11/1992 | Banker et al. | |
| 5,177,305 | 1/1993 | Pichat | |
| 5,188,649 | 2/1993 | Macedo et al. | |
| 5,203,901 | 4/1993 | Suzuki et al. | |
| 5,230,845 | 7/1993 | Hashimoto et al. | |
| 5,230,901 | 7/1993 | Einig et al. | |
| 5,237,940 | 8/1993 | Pieper et al. | |

FOREIGN PATENT DOCUMENTS

| | | | |
|---|---|---|---|
| 139071 | 1/1981 | European Pat. Off. | |
| 643450 | 1/1979 | U.S.S.R. | 501/62 |
| 887517 | 8/1979 | U.S.S.R. | |
| 2228476 | 8/1990 | United Kingdom | |

*Primary Examiner*—W. Gary Jones
*Assistant Examiner*—John Hoffmann
*Attorney, Agent, or Firm*—Pennie & Edmonds

[57] ABSTRACT

A method and apparatus of reclaiming hazardous inorganic wastes to produce an environmentally benign abrasive for use in loose grain processes, as a coated or bonded abrasive, or as a polishing grain. A tough and useful abrasive, with a MOH hardness of 7 to 8, is manufactured from emission control dusts of the aluminum industry or sludges from other industries, and may include small amounts of lead and cadmium oxides as toughening agents. The abrasive particles are sized by air sifting or by water sedimentation separating methods. The process for the manufacture of abrasive material comprises the steps of removing soluble salts from a waste stream by hot water extraction; using a computer matrix to group the waste stream into different batches for mixing with other glass-making materials to form a batch mixture; oxidizing the organic compounds contained in the batched mixture; melting the batch mixture to form a glasseous substance; and fritting the glasseous substance to form the abrasive. The process preferably uses a glass melter that will oxidize organics; a scrubber to recapture vaporized heavy metal oxides and particles of the glass-making materials; and an oxygen injection system ensure thorough burning of organics. Certain sodium compounds may be added to reduce the melting point of the batch mixture. An abrasive formed by the process of the invention may comprise the following components by weight: 48–56% silica; 18–30% alumina; 6–12% NaO; 6–12% CaO and MgO; 2–4% $Fe_2O_3$; and 0.1–1% PbO.

16 Claims, 2 Drawing Sheets

PROCESS FOR PRODUCING AN ENVIRONMENTALLY ACCEPTABLE ABRASIVE PRODUCT FROM HAZARDOUS WASTES

This application is a division of application Ser. No. 08/009,225, filed on Jan. 26, 1993 now U.S. Pat. No. 5,273,566.

FIELD OF INVENTION

The invention relates to a process and apparatus for utilizing hazardous inorganic wastes to produce a new, useful, and environmentally benign abrasive product for use in loose grain abrasive processes, as a coated or bonded abrasive, or as a polishing agent.

BACKGROUND OF THE INVENTION

There is substantial need throughout the world for technologies that are capable of producing safe and effective recycled products from various types of wastes, including "hazardous" wastes containing heavy metals. The most desirable method of recycling employs wastes as raw materials in the production of other safely usable products. The "hazardous" constituents of these products are often useful and valuable, yet, they are not fully exploited. Known recovery processes which attempt to recover certain elements from the waste stream, typically leave a substantial amount of residual slag or similar residual waste materials. These residuals typically contain "hazardous" components harmful to the environment.

The present invention is particularly well suited for recovering and reusing inorganic wastes such as emission control dusts or sludges. These wastes typically contain economically valuable levels of ingredients for making glass. They also typically contain organics, certain less valuable inorganic ingredients, and certain "hazardous" ingredients, such as lead, cadmium, chromium oxides or other heavy metals and/or compounds containing heavy metals.

An increasing measure of environmental concern throughout the world has grown from professional and public awareness of the increasing hazard of landfilling heavy metals and other inorganic wastes. Inorganic wastes are often hazardous due to their ability to react with acids and release soluble heavy metal compounds into the environment. This has focused attention on reducing landfilling and on regulations that prevent leachable toxic materials from being disposed of in landfills. The extent of groundwater pollution from leaching of heavy metals and other inorganic toxins is only now being understood.

As a result of groundwater pollution, federal law mandates that inorganic hazardous wastes now be "stabilized" prior to being landfilled. Stabilizing of inorganic wastes which renders the wastes inert or unreactive is a costly process and not always available. This has or will increased the cost of landfilling and, accordingly, the operating costs of the generators of the waste.

The cost of stabilization and landfilling essentially purchases a volume of space in a landfill. While the landfill will eventually become full and be "closed," the waste, stabilized or otherwise, remains in the ground exposed to other reactive elements. Inherent in any landfill, operating or closed, is the potential liability imposed in the United States by the Comprehensive Environmental Resources Compensation and Liability Act and in other countries, by similar laws.

Under these laws and the implementing regulations, corporations which generate waste remain liable for any damage which that waste may do to the environment. Further, the Resource Conservation and Recovery Act extends liability to waste generators which place wastes in landfills that subsequently leach or become contaminated, for the cleanup of those landfills. The waste generators' exposure is potentially huge, and does not end after a specific period of time. The potential liability extends in perpetuity and follows the waste generator and any subsequent entity related to the waste generator. This endless liability is another cost to corporations and, in certain cases, actually threatens a waste generator's continued existence.

The typical inorganic waste streams that contain these heavy metals are sludges from various processes or from waste water treatment; emission control dusts from high temperature industrial processes; fly ash from incineration of industrial and residential wastes; and certain other process-specific effluents. Examples of these are the aluminum industry's spent pot liner; refractory wastes from smelting, melting or refining furnaces; various types of slags and precipitants related to metal recovery operations from waste streams and certain glass wastes from producing television and cathode ray tubes.

The existing technology for dealing with these wastes is to use reduction or precipitation processes to recover metals from emission control dusts and sludges mostly from the steel industry and the plating industry. Emission control dusts are subjected to a reducing process in kilns to reduce chromium, zinc, and nickel from their oxides. In such cases, a fee is charged for processing and the recovered metals are sold back to the generator for reuse. Certain of the furnace slags, particularly in the aluminum industry, are processed to recover alumina, aluminum, and certain fluxing salts in a waste minimization program.

Methods of waste stabilization include: incorporating the hazardous wastes into cement; various types of chemical treatments; and vitrification, i.e., incorporating the hazardous waste into a glassy material. The principal danger from inorganic wastes is from heavy metal oxides and certain other oxides which may be considered "hazardous". Heavy, metal oxides readily react when exposed to strong acids or alkalines to produce soluble compounds. Vitrifying the metal oxide in a glass substantially reduces the oxides' solubility in acid. The incorporation of these materials in glass is one known long-term method of "stabilization".

This method, however, has proven to be extremely expensive for several reasons. First, substantial amounts of energy are typically required to melt the materials. Care must also be taken in batching the raw material to ensure that an amorphous glass is formed at the most insoluble phase of the glass material. Both factors significantly increase the cost of vitrification relative to rival technologies. Although vitrification is a highly desirable method of waste treatment, it is rarely used commercially because of its high cost. It has, however, frequently been utilized in laboratory research. Except in isolated circumstances, the process has never been put into commercial practice. Patents have been issued disclosing vitrification processes, however those processes each have limitations that are addressed by the instant invention.

One such patent is U.S. Pat. No. 5,009,511 to Sarko, et al for "INORGANIC RECYCLING PROCESS", issued Apr. 23, 1991. The Sarko, et al reference teaches a mobile system for fixing hazardous wastes in a silicate matrix for subsequent disposal. Although this reference teaches a vitrification process for disposal of hazardous wastes, it is directed to stabilizing those wastes in a silicate matrix. Further, while this type of material is acceptable for use in stabilizing wastes, it is inappropriate for fabrication of a high hardness, abrasive material. Moreover, Sarko, et al does not disclose a material having the desirable characteristic of an alumina content in the range of 15 to 30%. contemplated by this reference.

Another example is U.S. Pat. No. 5,002,897 to Balcar, et al. for "METHOD FOR HAZARDOUS WASTE REMOVAL AND NEUTRALIZATION," which discloses a method for disposing of hazardous waste from secondary aluminum smelting in a neutralized amorphous glass product. The waste gas stream from the aluminum smelting process is directed towards a baghouse dust collector which comprises a series of fibrous filters to remove residues from the waste stream. The residue forms a coating on the filters, which is periodically removed and discarded as hazardous waste. The hazardous wastes which include metal oxides, are combined with glass dust and sodium silicate are melted to the molten state. These additives neutralize the wastes by dissolving the metal oxides in the molten glass to form a neutralized amorphous glass. The glass in turn helps prevent leaching of the metal oxides.

However, Balcar, et al does not describe a process which provides for the extraction of soluble salts via a hot water extraction process. Moreover, Balcar, et al is directed to collection, via bag-house filtration, and re-processing of hazardous waste products resulting from the aluminum smelting process. Additionally, Balcar, et al requires that powdered soda-lime glass be seeded into the flow of airborne hazardous waste. The seeded soda-lime glass and hazardous waste is directed into a baghouse as part of the pre-coat material, which also includes lime, generally hydrated agricultural lime or calcium hydroxide. As the precoat of the baghouse, the soda-lime glass powder and the lime is intimately mixed with the effluents from the furnace or other heating device. This had the undesirable effect of increasing raw materials costs. Moreover, addition of soda-lime glass powder and lime renders the fabrication of high hardness, alumina containing materials relatively expensive, while reducing yield of usable end product.

Thus, a need exists for an environmentally acceptable, efficient, and cost-effective process for removing and neutralizing hazardous wastes, such as heavy metal oxides, from the waste stream and for reusing or recycling the wastes as raw materials in the production of safe and useful products. One problem that has threatened some attempts to resolve these concerns is the lack of appropriate reasonable uses for recycled products incorporating heavy metal oxides. By virtue of its hardness and toughness, amorphous glass is useful as an abrasive. In glass, lead oxide in small quantities can serve as a toughening agent.

There are essentially four market segments for abrasives. First, bonded abrasives are manufactured from abrasive particles which are normally joined by some form of organic binding agent. For example, bonded abrasive may form grinding and cutting wheels. Another form of bonded abrasives are tumbling abrasives, which are typically used in fine metal finishing.

The second general market for abrasives is for so-called "coated abrasives." In these, the abrasive is bonded to a substrate. For example, the abrasive may be bonded to paper, to form sandpaper.

The third general market segment for abrasives is for "loose grain" abrasives, in which the abrasive particles are thrown at a surface at high speed, in a stream of compressed air or pressurized water. The abrasives attack the surfaces of the metal, removing coatings or scale and leaving a clean surface. While sand is often used as a loose grain abrasive, its use is now restricted in several countries. This is due to the potential of silica-based fine abrasive particles to cause lung damage. Other fine loose grain abrasives include glass beads and fused aluminum oxide. These latter two abrasives are typically used for removing scale, coatings, and for finishing aircraft engine parts or materials which must meet specifications for a smooth surface finish. They are called "fine" because they are fine or small particle. Standards exist for the cleaning of aircraft surfaces with such treatments.

Loose grain media are also used for shot peening, for transforming the stresses in the surfaces of metals from tensile to compressive. This is done mainly to increase the useful life of the metal or to increase its resistance to fatigue cracking. Fine loose grain abrasive cleaning and finishing and shot peening are extremely efficient, as compared to other alternate methods of smoothing surfaces.

The fourth general form of abrasive is polishing agents. These are typically hard materials of extremely fine particles ranging in size from 1 or 2 microns up to 25 or 30 microns. These are often used in connection with cleaning, typically in burnishing and polishing machinery for finishing metals, ceramics, and glass articles.

A common material used for all of these types of abrasives is fused aluminum oxide. Fused aluminum oxide is manufactured by heating alumina to extremely high temperatures, i.e., approximately 2200°–2400° C. typically in an electric arc furnace, to produce a mass of crystalline alumina. Crystalline alumina is denser than natural alumina and possesses greater strength. Fused aluminum oxide has a hardness between 8 and 9 on the MOH scale, or a Vickers hardness of approximately 2000. In contrast, crystalline quartz or sand has a hardness of only about 7 on the MOH scale. Common soda lime glass has a Vickers hardness of approximately 420 and quartz has a hardness of 590. Soda lime glass in beaded form is well known as a cleaning and finishing media, and it is also used for shot peening.

While crushed soda lime glass is inexpensive and may also be used as an abrasive, it has a severe disadvantage. Hydrolysis will occur between the particles if they become wet. This binds the particles together, causing clumping and, eventually hardening. Hydrolysis typically occurs between the sodium ions on the surface of the glass. Sodium oxide makes up approximately between 12–14% of a typical soda lime formulation. This is also true of glass beads. Glass beads, however, are easier to keep dry with desiccation due to their reduced surface area. However, glass beads are not suitable for the applications to which angular abrasives are normally put. This is because glass beads are spherical and thus clean by peening a surface underneath a coating, cracking the coating off. If a coating is bonded adhesively to a surface, glass beads do not work as well since they do not break the adhesive bond. Rather angular abrasive materials, such as fused aluminum oxide, which has cutting surfaces, cut into contaminants and coatings to remove them faster than glass beads.

Quartz suffers from another deficiency, which is generally considered more serious than hydroscopicity. When shattered, quartz fractures along the silicon-to-oxygen bonds, leaving unbonded silicon. This is known in the trade as "free silica". This unbonded silicon (SiO) reacts slowly at ambient temperatures with molecular oxygen ($O_2$). Free silica, when it reacts with oxygen, forms silica ($SiO_2$). Fine, breathable particles of free silica can combine quickly with nascent oxygen in the lungs of humans or animals and bind to the lung tissue. This hardens the lung tissue and reduces its oxygenation potential. Over time, this process results in an irreversible deterioration in lung function. This disease process has come to be known as "silicosis." As a result of the health risks of silica, the use of fine silica particles is outlawed or restricted by regulation in many countries.

Thus, a need exists for an abrasive particle in the hardness range between glass and fused aluminum oxide. This material should have a hardness of approximately 7 MOH. It should not be hydroscopic, allowing it to be separated by water sedimentation methods. It should also be environmentally acceptable.

The invention described herein addresses these needs by employing emission control dusts from the secondary aluminum industry, as well as other segments of the metals industry, as well as fly ash from industrial incinerators, to produce a glass abrasive product containing a high percentage of alumina, with a Vickers hardness of between approximately 620 and 680. None of the known approaches, prior to the present invention, are able to resolve all of these concerns in as cost-effective and reliable a manner as is the present invention.

OBJECTS OF THE INVENTION

It is therefore an object of the present invention to provide a method and apparatus for using inorganic wastes as a feed stock to produce an environmentally acceptable and effective abrasive.

Another object of the present invention is to provide a product manufactured from emission control dusts and sludges from the aluminum industry and other industries, which is capable of forming tough and useful abrasives.

Another object of the present invention is to provide an abrasive product manufactured from emission control dusts and sludges of the aluminum industry and other industries which may also contain small amounts of lead and cadmium oxides as toughening agents.

An additional object of the present invention is to provide an abrasive product in the form of particles which can be sized either by screen sifting, by air flow classification methods or by water sedimentation separating methods.

A further object of the present invention is to provide a product with characteristics suitable for use as a coated abrasive.

Another object of the present invention is to provide an abrasive product containing specified percentages of alumina, to be used as a loose grain fine abrasive or as a polishing grain.

Yet another object of the present invention is to provide an abrasive product which may be manufactured from virgin materials.

Yet another object of the present invention is to provide an abrasive product which may be manufactured from a variety of feed stock materials.

Another object of the present invention is to provide an abrasive product with a MOH hardness of 7 to 8.

An additional object of the present invention is to provide a process for manufacturing abrasive material using a glass melter that will oxidize organics, and a scrubber that will recapture vaporized heavy metal oxides and particles of glass-making ingredients.

Another object of the present invention is to provide a process using an oxygen injection system, to ensure thorough burning of organics in the melt.

Yet another object of the present invention is to provide a process which produces a cost-effective abrasive comprising silica, alumina, and lime.

A further object of the present invention is to provide a process in which certain sodium compounds can be added to the melt to reduce the melting temperature.

These and other objects and advantages of the invention will become apparent from a perusal of the description of the invention, the drawings and the claims which follow.

SUMMARY OF THE INVENTION

The invention relates to a method of utilizing "hazardous" inorganic wastes to produce an effective and environmentally acceptable abrasive product for use in loose grain processes as an abrasive or a polishing grain. To achieve the objects of the invention, and in accordance with the purpose of the invention, as embodied and broadly described herein, the invention is a process for manufacturing an abrasive, which comprises a pre-treatment process for removing soluble salts from the hazardous waste stream; using a computer matrix to assay and group a volume of material having aluminum oxide component into different lots based on their chemical composition for batching and mixing with glass-making materials to form a batch mixture; depositing said batch mixture within a melter means having an outlet means; heating said batch mixture within said melter to a working temperature sufficient to oxidize the organic compounds contained in said batch mixture; melting the remaining batch mixture to form a glasseous substance; and passing said glasseous substance through said outlet means to a fritting means; wherein said glasseous substance is fritted to form the size and shape of said abrasive.

The instant invention also relates to a process for manufacturing a high hardness abrasive material comprising between 15% and 35% alumina. This high hardness material is fabricated by providing a volume of hazardous waste materials comprising at least aluminum oxide, heavy metal elements and organic compounds. Thereafter a volume of glass-forming materials is added to the hazardous waste, the volume and composition of the glass-forming materials being dependent upon the composition of the hazardous waste. Typical glass-forming materials include silica, sand, soda ash and combinations thereof. In the event that the hazardous waste materials further include soluble salts, the process my include the further step of removing said soluble salts by hot water extraction.

The mixture of hazardous waste and glass-forming materials is heated in an oxidizing environment, to a temperature sufficient to oxidize any organic compounds present in said hazardous waste, and vaporize said heavy metal oxides except for the oxides of chromium. The hazardous wastes and said glass-forming materials are heated to the molten state in an oven means comprising a vapor exhaust means and an outlet means. Oxidized/vaporized heavy metal oxides are recovered by a process comprising the steps of: passing said vaporized heavy metal oxides through the vapor exhaust means to a scrubber means; precipitating the heavy metal oxides by quenching the vaporized heavy metal oxides in said scrubber means; and collecting said precipitated heavy metals oxides in a filter means. The remaining mixture is then melted to form a molten glasseous substance, which is quenched to form the high hardness abrasive material.

To achieve the objects of the invention, and in accordance with the purpose of the invention, as embodied and broadly described herein, the invention is also an abrasive compound, comprising an alumina bearing material which is fracture resistant and well shaped as in blocky, spheroidal and pyramidal particles which can be used in loose grain abrasive blasting; as a coated abrasive particle and as a polishing and finishing agent. The collected heavy metal oxides mat be added to the molten glasseous substance to increase the hardness of the abrasive material.

It is to be understood that both the foregoing general description and the following detailed description are exemplary and explanatory only, and are not restrictive of the invention as claimed.

The accompanying drawings, which are incorporated by reference and constitute a part of this specification, illustrate a preferred embodiment of the invention, and, together with the description, serve to explain the principles of the invention.

BRIEF DESCRIPTION OF THE DRAWINGS

The invention will now be discussed in more detail, with particular reference to the drawings.

DETAILED DESCRIPTION OF THE INVENTION

Figure 1:
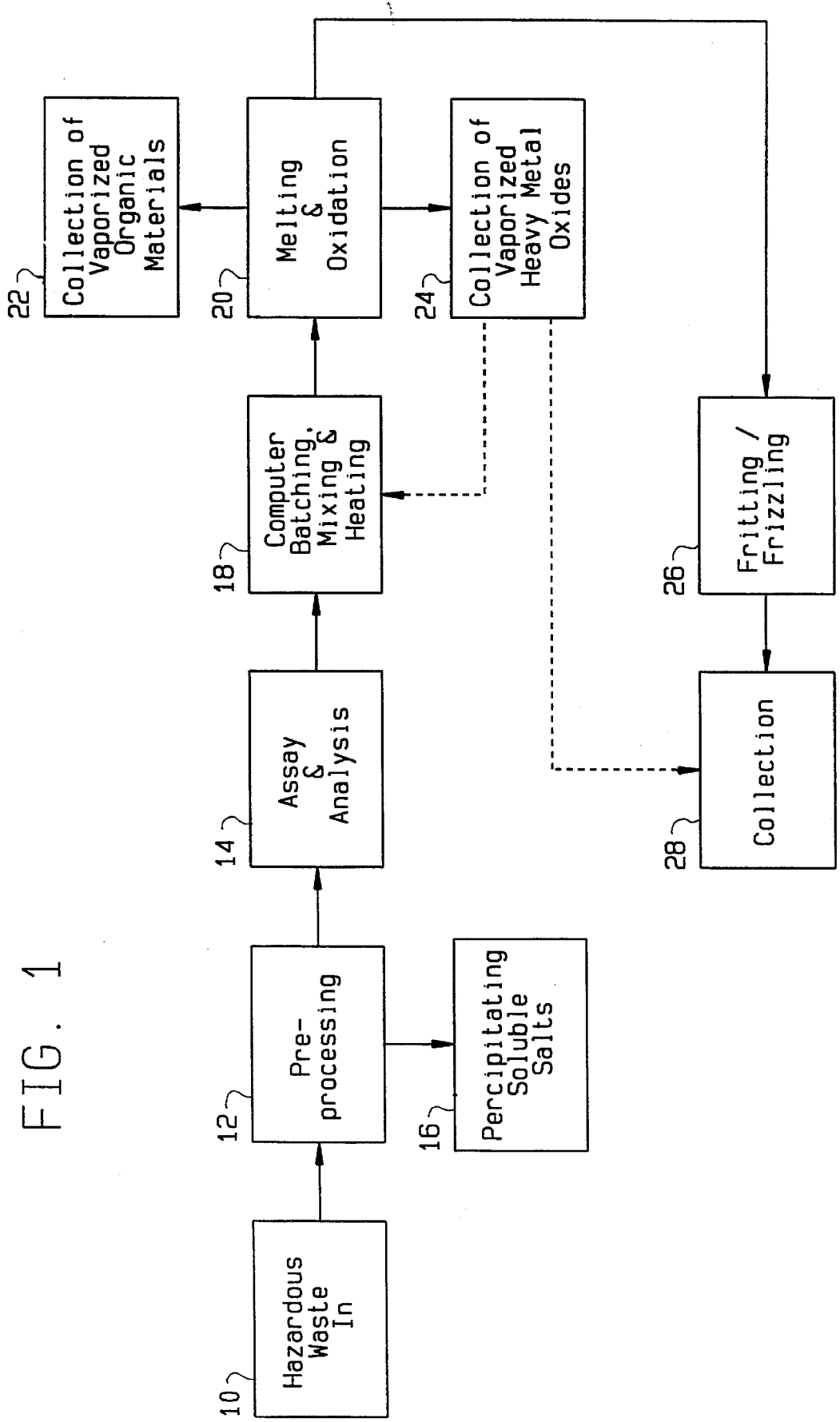
FIG. 1 is a flow chart illustrating the steps involved in processing hazardous wastes into an environmentally benign abrasive product.

Reference will now be made to a preferred embodiment of the present invention, an example of which is illustrated in the accompanying drawings. A preferred embodiment of the invention is illustrated in FIG. 1.

In one preferred embodiment, the present invention is a process for making an effective and environmentally acceptable abrasive product from the effluent of industrial incinerators and emission control dusts of, for example, the aluminum industry. These industrial wastes typically contain significant percentages of alumina. Included with the alumina may be siliceous materials, calcium compounds, magnesium compounds, iron compounds and heavy metal compounds. FIG. 1 illustrates the process in accordance with one preferred embodiment of the present invention. As shown in FIG. 1, the process preferably comprises the general steps of: pre-processing the waste stream; using a computer-based matrix system to group the waste stream into different batches; mixing the feed stream with other glass-making materials to form a batch mixture; melting the batch mixture to form a glass; and fritting the glass to form an abrasive. The process also oxidizes the organics and vaporizes the heavy metal oxides contained in the mixed batch mixture during the melting phase. Heavy metal oxides, which may be discharged with the exhaust gases, may later be recovered. Of course, the first step in the process of producing an environmentally acceptable abrasive product from a stream of hazardous wastes is to provide hazardous wastes. This step is illustrated as Box 10 of FIG. 1. The hazardous waste stream employed in this process typically includes a relatively high aluminum content, heavy metals elements and compounds, and other organic and inorganic wastes and toxins.

PRE-PROCESSING

As embodied herein, the pre-processing step of the present invention includes the extraction of soluble salts from the waste stream. This pre-processing step is illustrated in FIG. 1 as Box 12, and more particularly includes a hot water extraction process for removing soluble salts from the waste stream. The hot water extraction process is done as waste materials arrive for processing. The incoming waste is washed and stirred in a water bath equal to twenty (20) times the weight of the raw waste being washed. The water bath is a hot water bath in which the bath temperature is maintained at about 50 to about 80 degrees C. The materials will remain in the water bath for a period of time equal to about 2 hours.

The resulting solution is passed through a filter press, where the insoluble components of the waste stream are caught and retained as a filter cake. The filter cake is then partially dried and repackaged. A number of different filter cakes can be merged for easier control of assaying. The material is also weighed before the extraction process and again after the filter cake resulting from the hot water extraction. The weight loss is recorded in a computer batching matrix, which organizes the extracted material for batching and melting.

After completing the hot water process, the extracted filter cakes of the hazardous wastes (such as emission control dusts) are segregated and merged into lots. These lots are then sampled by known assaying methods for organic content, alumina content, and the content of other relevant materials. The step of assaying and analyzing the content of the filter cakes is illustrated as Box 14 of FIG. 1. While any number of known assaying techniques may be employed, it is most important to accurately measure the percentage of alumina and the percentage of inorganic materials. Accordingly, the amount of organic material may be easily ascertained by conducting an energy content test, or a loss-on-ignition test. A thermogravimetric analysis may also be employed to identify the amount of organic material present in the lot, as well as the percentage of hydrates. The presence of heavy metals can be easily determined through the use of an atomic absorption spectrophotometer or other similar techniques. A combination of each of these tests, plus historical data relating to specific type of waste generated by specific waste generator can be used to establish the characteristics of the materials.

As embodied herein, the data collected from the analysis of each lot is entered into a computer batching matrix for analysis and recording and for development of melting batches incorporating the addition of glass formers and modifiers such as silica and soda ash respectively. The computer batching process is discussed in greater detail hereinbelow.

The soluble salts collected from the hot water extraction process are the residual after concentration, crystallization and evaporation. This step in the inventive reclamation process is illustrated in Box 16 of FIG. 1. The collected soluble salts are tested for heavy metals to determine their potential as by-products. For example, the collected soluble salts may be usable for roadway ice melting purposes, for weed control or reused in metal processing. However, in order to be usable for these purposes, the salts must be substantially free from heavy metals.

BATCHINC AND MIXING

The invention preferably further includes a computer batching system which tracks the characteristics of particular waste streams from particular waste generators, across time affording an understanding of the historical trends in constituent percentages of the total weight. It also creates batch matrices into which the lots of particular waste streams with the other ingredients, mainly glass formers such as sand and modifiers such as soda ash, are fitted to produce particular abrasive specifications. The contents of each batch will, in turn, meet the required product specifications. The step of batching by computer matrix is illustrated in FIG. 1 as box 18, and includes the further step of inputting the results of the chemical assaying discussed hereinabove with respect to the pre-processing of the wastes stream.

Many of the particles included in the batch mix are fine particles, measuring between 2 and 20 microns across their broadest dimension. These particles are dusty and, by virtue of their extremely small size, cannot be handled directly in the batch mix. For this reason, they may be coated to coagulate them onto larger particles of the batch mix. In a preferred embodiment of the present invention, to a mixture of water and glycerin, or other suitable materials that will readily evaporate or oxidize and will not impede the heating of the particles and particularity the organics, is used. The fine particles inside the melter will be further managed by baffles within the melter which will keep them from continuing to travel in the gas stream and direct them to settle out in the molten glass. Certain types of heating routines may be used in this connection where the feed is periodically reduced or increased as may be sensed to be needed in the exit from the melter atmosphere. The heating routines are a function of the batching matrix, and will depend upon the composition of the starting materials, including, but not limited to, the amount of iron and organic matters present in them.

MELTING AND OXIDATION

In a preferred embodiment of the present invention, the batched mixture is next delivered to an apparatus adapted to melt the batch mixture into a glass-like material in an oxidizing environment. The melting apparatus is further adapted to oxidize organic materials and vaporize heavy metal oxides in the gas stream. The step of melting the waste stream is illustrated in FIG. 1 as Box 20. The collection of the vaporized organic materials is illustrated as Box 22, and the step of collecting vaporized heavy metal oxides is illustrated in Box 24 of FIG. 1. Under certain circumstances, it may be desirable to add collected heavy metal oxides to the batch mixture.

Melting in an oxidizing environment is required in order to assure that organic materials are oxidized as completely as possible from the batched mixture. An oxidizing environment also serves the function of oxidizing at least some fine elemental or alloyed metal particles in the batched mixture. Moreover, failure to melt the batched mixture in an oxidizing environment could lead to reduction of the heavy metals or other metal oxides, particularly if carbon is present in the batched mixture. Carbon would reduce metal oxides to the metal and carbon dioxide, thus making it more difficult to reclaim the metal component of the batched mixture. Metal components or molten glass are also damage refractories and cause premature failures.

Figure 2:
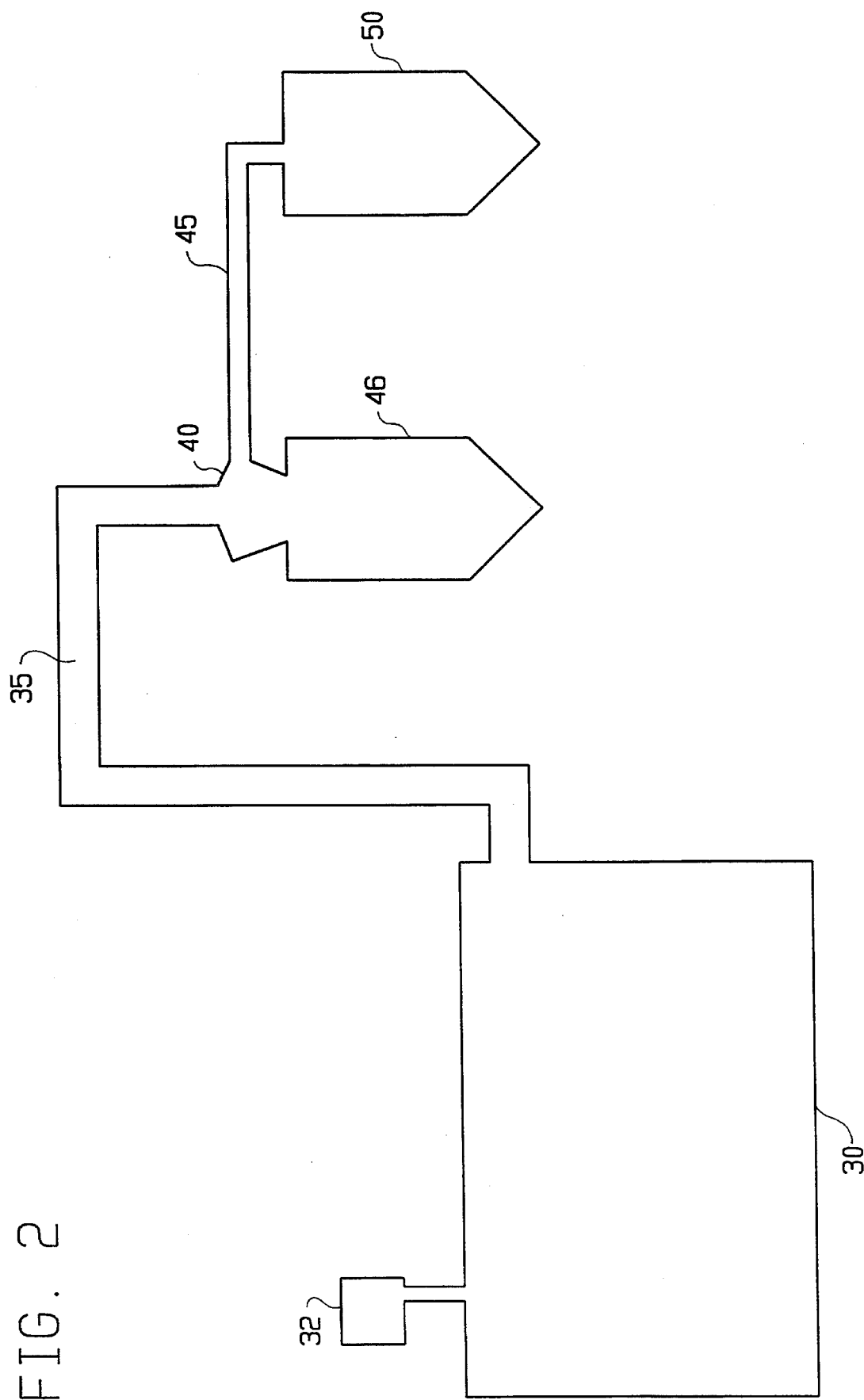
FIG. 2 is a vertical sectional view of the melter apparatus of the present inventive process, as illustrated in FIG. 1.

An appropriate apparatus for melting the batch mixture is a glass melter as illustrated in FIG. 2 and indicated generally as 30. As embodied herein, glass melter 30 is also adapted to oxidize organic materials in the batch mixture. Thorough oxidation of organic materials is ensured by providing an oxygen injection system 32 which assures an oxidation atmosphere in the melter. As embodied herein, glass melter 30 also vaporizes any heavy metal oxides, such as for example, lead and cadmium oxides, and excepting chromium oxides, in the batch mixture. The vaporized heavy metal oxides are directed from the melter 30 to a scrubber 40 attached to the melter via an exhaust duct 35.

The scrubber 40 is a wet/dry scrubber which condenses the metal oxides from the stream of vaporized materials. Vaporized heavy metals are preferably maintained in the vapor state in the melter 30 and in the exhaust path 35 from the melter 30 to the first quench zone 45 of the scrubber 40. Temperatures along the exhaust path should be maintained above about 1100° C. to avoid the precipitation of the heavy metals prior to the quench zone 45. Premature precipitation will cause such the heavy metals to accumulate in the exhaust pathway 45.

In a preferred embodiment of the invention, scrubber 40 is a wet/dry scrubber, such as the Waterloo Scrubber known is the art, modified to recapture the vaporized heavy metal oxides and particles of the glass-making materials from the melter exhaust gases. In a preferred embodiment of the present invention the exhaust gasses are quenched in the quench zone 45 by exposure to a spray of water and by exposure to the water irrigated surfaces of the quench zone 45. The quench water is recovered and filtered through a filter press to remove the precipitated lead oxide and cadmium oxide. In general, this water will be maintained in a slightly alkaline condition with the use of calcium hydroxide. Specifically, the scrubber liquid is maintained at a pH of about 9 and is regularly monitored to assure that it remains in an acceptable range.

The air stream is passed through a wet particle scrubbing zone or a "contact" zone where water vapor contacts the particles in the gas stream and removes them by a wetting process. The moisture is then removed from the air with the particles in the zone of an axial fan and in the moisture entrapment zone. The water containing the particles is treated in a treatment process to remove the particles in a filter. The filter cake of particles contains glass making ingredients such as silica, alumina, magnesia, calcia, soda, potash and zinc oxide which can be used in batching materials after being assayed and analyzed. After the collection materials are complete, they are assayed and the resulting data is entered into the computer batching matrix. They are reused in this or other glass processes.

After passing through the contact zone, through the axial fan and through the entrapment zone the air is then heated to approximately 150° C. The air stream is then passed through a dry baghouse 50 which substantially collects any remaining metal oxides allowing any remaining water to pass through and be collected for reuse or disposal.

The precipitated heavy metals are collected in collection chamber 46. The metal oxides are then dried and collected. The lead oxide and cadmium oxides can be later used as a raw material for other glass manufacturing processes.

The temperature of the glass melter 30 is adjusted to heat to the proper melting temperature for a batch mixture of a given composition. For example, furnace temperatures may need to be increased depending on the amount of high melting point material, such as iron, that is present in the batch. Additionally, the melting point of the batch mixture may be changed by the addition of various materials. For example, certain sodium compounds such as $Na_2CO_3$, or $NaSiO_3$ may be added to reduce the melting point of the batch mixture. In addition, thermal analysis, i.e., the weight and energy gain or loss and gas emission as a sample material is heated to, for example, 1000° C. in 10° C. increments and viscosity measurements are also input into the process base data in order to determine the optimum melter temperature. Melting will occur in an oxygenizing atmosphere, though the time/temperature regimen will depend upon the starting materials of the batch mixture and the specific composition of the material. For example, materials with a high content of metal oxides with high melting temperatures will take longer to melt at a given temperature.

In a preferred embodiment of the present invention, the process oxidizes substantially all organics which are present, as well as all metals present as fine particles. The minimum temperature required to perform this oxidation is 1250° C. for producing the abrasive particles. During the processing of emission control dusts or sludge as a feed stock, organic constituents of the melt will be exposed to a temperature of 1250° C. in an oxygen rich atmosphere for a period of greater than three seconds. This will also satisfy requirements for the destruction of PCB's and other possible toxic organics present in the batch mixture. The required vaporizing temperature is 1100° C. for lead and cadmium oxides, though the upper vaporizing temperature is approximately 1750° C. in order to assure vaporization of fluoride containing compounds in the batch mixture. As embodied herein, the melter 30 should provide for a long dwell time. The melter 30 should also provide for oxygen injection to insure complete oxidation of the organic compounds. In a preferred embodiment of the present invention, the melter 30 will oxidize up to 500 ppm toxic organics, allowed in the waste stream under current EPA regulations.

The final product is discharged (as described below) directly into a water bath or may be first "frizzled."

FRITTING AND FRIZZLING

In a preferred embodiment of the present invention the resulting glass is fritted to the correct shape. This step is illustrated in Box 26 of FIG. 1. Sizing of the materials is accomplished by discharging the material at high temperature (1200° C.) from the melter 30 to a quenching water bath. This produces blocky or block-like, round or spheroidal and pyramidal shaped particles with high fracture resistance. The resulting intregal particles are between 75 and 125 microns in maximum dimension. The temperature at fritting is critical to produce this result. This temperature of the outflow of glass must be adjusted to impart to the glass a low viscosity just prior to fritting.

Alternatively, it is possible to spray the glass as it emerges from the furnace with a fine mist of cooling liquid, such as water. This process is called frizzling in which the flow of melted liquor is sprayed with a fixed amount of water to begin the cooling process. Frizzling results in larger particles than in fritting. These particles are then dropped onto a refractory belt composed of ceramic materials with high melting temperatures where the individual particles still have enough residual heat to heal cracks in them. This particular process may be employed in the manufacture of coarse abrasives.

The resulting materials, whether fritted or frizzled, is then collected as illustrated in Box 28 of FIG. 1. Under certain circumstances, it may be desirable to add collected heavy metal oxides to the collected abrasive product.

EXAMPLES

Example 1

In one variation of the process, emission control dusts from the aluminum industry are formulated directly to the specifications of the abrasive material. This material is known as "Alumaglass." An initial volume of emission control dust, weighing 200 gm, was submerged and stirred in a hot water bath having a weight of approximately 20 times that of the emission control dust, i.e., approximately two liters of water. The hot water bath was maintained at a temperature of approximately 80° C.

The emission control dust was allowed to remain in the hot water bath for 2 hours, after which time the entire mass was passed through a filter. The filtered materials were weighed in order to determine the loss in weight. The filtered materials weighed 112 gm. The filtrate was evaporated to crystallize and collect the soluble salts washed out in the water bath. The filtrate consisted mainly of Calcium chloride dihydrate and some complex calcium hydrate salts. No evidence of heavy metals was found. There salts will be dehydrated prior to use by calcining.

The materials collected on the filter weighed 112 gm and consisted of the following materials in the following percentages in the column below to the left:

| Material | Percent of Total |
| --- | --- |
| $SiO_2$ | 3.59 |
| $Al_2O_3$ | 28.72 |
| MgO | 7.23 |
| CaO | 3.74 |
| $Na_2O$ | 0.44 |
| $Fe_2O_3$ | 1.48 |
| $TiO_2$ | 1.48 |
| MnO | 0.56 |
| $P_2O_5$ | 0.46 |
| ZnO | 0.28 |
| $Li_2O$ | 0.03 |
| CoO | 0.01 |
| Loss on Ignition (organics) | 48.70 |

The 112 gm sample of material was placed in a crucible fabricated of zirconia. The batching/mixing matrix indicated that 41.3 gm of sand and 19.8 gm of soda ash should also disposed into the crucible. The crucible and materials were placed in a melting oven. The oven was heated to a temperature of between 1450° C. and 1500° C. An oxidizing atmosphere was maintained inside the melting oven. The temperature of the oxidizing atmosphere was maintained at approximately 1480°–1500° C. The melt temperature was maintained for a period of approximately 4 hours. Thereafter, the molten material was discharged directly into a water bath maintained at a temperature of between 90° and 95° C. The resulting fritted material had a size distribution of between 250–75 microns.

The resulting high hardness, abrasive material included the following components in the following percentages:

| Mateial | Percent of Total |
| --- | --- |
| $SiO_2$ | 49.20 |
| $Al_2O_3$ | 25.80 |
| MgO | 6.40 |
| CaO | 3.40 |

-continued

| Mateial | Percent of Total |
|---|---|
| Na₂O | 8.40 |
| Fe₂O₃ | 1.30 |
| Balance (various) | all ≦0.25 |

Example 2

In another variation of the process an emission control dust from the aluminum industry is mixed with a waste water treatment sludge ("WTS") containing mainly lime, alumina, magnesia and silica and which may be hazardous by characteristic for lead according to the Toxic Constituent Leaching Procedure ("TCLP") test 1311.

After completing the hot water extraction process on the emission control dust as described in Example 1, the wastes comprised the following materials in the following percentages:

| Material | Percent ECD Total | Percent WTS Total |
|---|---|---|
| SiO₂ | 0.00 | 2.60 |
| Al₂O₃ | 74.30 | 4.20 |
| MgO | 6.30 | 1.33 |
| CaO | 0.00 | 47.60 |
| Na₂O | 0.00 | 0.28 |
| Fe₂O₃ | 1.50 | 1.20 |
| TiO₂ | 0.40 | 0.76 |
| P₂O₃ | 0.00 | 0.13 |
| ZnO | 0.00 | 1.90 |
| CaF | 11.30 | 0.00 |
| So₃ | 0.00 | 4.38 |
| PbO | 0.00 | 0.87 |
| SrO | 0.00 | 0.22 |
| K₂O | 0.00 | 0.13 |
| Zn₂O₂ | 0.00 | 0.01 |
| F₂/Cl₂ | 1.30 | 15.00 |
| Loss on Ignition (organics) | 0.90 | 14.33 |
| C | 0.00 | 5.06 |
| Insolubles | 4.30 | 0.00 |

The batching matrix determined that 144 gm of WTS should be mixed with 40 gm of ECD. The batching matrix also indicated that 40 gm of silica sand and 16 gm of soda ash should be added to the mixture. The silica sand and anhydrous sodium silicate was added to the mixture. The mixture was subjected to the same heating regimen described above in Example 1. The resulting high hardness, abrasive material comprised the following components in the following percentages:

| Material | Percent of Total |
|---|---|
| SiO₂ | 52.02 |
| Al₂O₃ | 27.50 |
| MgO | 2.00 |
| Fe₂O₃ | 1.40 |
| CaO | 9.40 |
| Na₂O | 7.50 |
| TiO₂ | 0.22 |
| ZnO | 0.05 |
| So₃ | 0.01 |
| PbO | 0.09 |
| K₂O | 0.11 |

With respect to the high hardness, abrasive product fabricated according to the above examples, the specifications of this material are as follows:

| Physical Properties: | |
|---|---|
| Color: | Black-opaque (Gray in fine sizes) |
| Structure: | Amorphous |
| Hardness: | 575–625 Knoop - 100 gm. |
| Density: | 2.7–2.8 gm/cc |
| Softening Point: | 1100–1125° C. |
| Working Point: | 1150° C. |

Exemplary high hardness, abrasive materials will comprise at least the following materials in the following amounts:

| Chemical Constituents: | |
|---|---|
| SiO₂ | 48–54% |
| Al₂O₃ | 22–28% |
| Na₂O | 8–10% |
| Ca₂O | 8–12% |
| MgO | |
| Fe₂O₃ | 1–3% |
| PbO | 0.1–1% |
| Others | Max. 0.25% |

This material has superior characteristics as a loose grain abrasive. This indicates that it will also be a superior material for the manufacture of coated abrasives for wood and metal working and conceivably also, on a limited basis, bonded abrasives. Because it can be separated into size profiles by water sedimentation, it can also be used as a polishing material.

Part of the formulation requires a small amount of lead to be included in the glass of extraordinary toughness as well as adequate hardness for abrasive applications. The glass contains small amounts of iron oxide which renders it a black color which is desirable for materials used as loose grain or coated abrasives. Dark colors are necessary to show the residual material after clean-up or blow-off and thus assist in quality assurance by identifying that the abrasive has not been cleaned away adequately.

It will be apparent to those skilled in the art that various modifications and variations can be made to the present invention and in particular to the specification or the claims without departing from the scope or spirit of the invention. Thus, it is intended that the present invention cover the modifications and variations of the invention provided they come within the scope of the claims and their equivalents.

We claim:

1. A process of manufacturing an abrasive, which comprises the steps of:

(a) grouping a volume of material into lots having different chemical compositions for batching;

(b) mixing lots with glass-making materials to form a batch mixture;

(c) melting the batch mixture to form a molten glasseous substance which comprises the following components by weight:

| Silica | 48 to 56 percent |
|---|---|
| Alumina | 18 to 30 percent |

-continued

| | |
|---|---|
| Sodium Oxide | 6 to 12 percent |
| Calcium Oxide and Magnesium Oxide | 6 to 12 percent |
| Iron Oxide | 2 to 4 percent |
| Lead Oxide | 0.1 to 1 percent; and |

(d) fritting said glasseous substance to form said abrasive.

2. The process of claim 1, wherein said abrasive is non-hydroscopic and has a MOH hardness between 7 and 8.

3. A process according to claim 1 in which the grouping of step (a) comprises using a computer matrix to group said volume of material into said lots.

4. A process according to claim 1 which further comprises selecting waste material selected from the group consisting of sludge from waste water treatment, emission control dusts, fly ash, spent pot liner from aluminum manufacturing, refractory waste from smelting, melting, and refining furnaces, slags and precipitants from metal recovery operations, and glass waste from television and cathode ray tubes for use as at least part of the volume of material for batching in step (a).

5. A process according to claim 4 wherein the waste material used in step (a) contains aluminum oxide, heavy metal elements, and organic compounds, and the batch mixture formed in step (b) is melted by heating in an oxidizing environment to oxidize and vaporize said organic compounds and to form vaporized heavy metal oxides.

6. A process according to claim 5 which further comprises recovering the vaporized heavy metal oxides and adding them to the batch mixture of step (b) in an amount sufficient to increase the hardness of the fritted glasseous substance of step (d) relative to the hardness of an otherwise identical fritted glasseous substance not containing said heavy metal oxides.

7. A process according to claim 4 wherein the waste material also contains soluble salts and which further comprises removing said salts by extraction prior to grouping said waste material into lots in accordance with step (a).

8. A process according to claim 1 which further comprises quenching exhaust gasses arising from the melting process of step (c) prior to the fritting step.

9. A process according to claim 1 in which fritting step (d) comprises quenching the molten glasseous substance formed in step (c) to form said abrasive in the form of blocky, spheroidal, and pyramidal shaped particles of abrasive material having an MOH hardness of 7 to 8.

10. A process according to claim 1 wherein the glass-making materials of step (b) comprise silica sand or soda ash.

11. A process of manufacturing an abrasive according to claim 1, in which the molten glasseous substance of step (c) comprises the following components by weight:

| | |
|---|---|
| Silica | 48 to 56 percent |
| Alumina | 18 to 30 percent |
| Sodium Oxide | 6 to 12 percent |
| Calcium Oxide and Magnesium Oxide | 6 to 12 percent |
| $Fe_2O_3$ | 2 to 4 percent |
| PbO | 0.1 to 1 percent. |

12. A process for manufacturing an abrasive, which comprises the steps of:

(a) forming a molten glasseous substance which comprises the following components by weight:

| | |
|---|---|
| Silica | 48 to 56 percent |
| Alumina | 18 to 30 percent |
| Sodium Oxide | 6 to 12 percent |
| Calcium Oxide and Magnesium Oxide | 6 to 12 percent; |
| Iron Oxide | 2 to 4 percent; and |
| Lead Oxide | 0.1 to 1 percent |

(b) fritting said glasseous substance to form said abrasive.

13. A process according to claim 12, in which the molten glasseous substance comprises the following components by weight:

| | |
|---|---|
| Silica | 48 to 56 percent |
| Alumina | 18 to 30 percent |
| Sodium Oxide | 6 to 12 percent |
| Calcium Oxide and Magnesium Oxide | 6 to 12 percent |
| $Fe_2O_3$ | 2 to 4 percent |
| PbO | 0.1 to 1 percent. |

14. A process according to claim 13 wherein the glasseous substance is formed by melting a batch mixture which is obtained by mixing batched lots of glass-making materials.

15. A process according to claim 14 wherein the batched lots include material containing aluminum oxide, heavy metal elements, and organic compounds.

16. A process according to claim 15 which further comprises using a computer matrix to group material into lots having different chemical compositions from which said molten glasseous substance is formed.

* * * * *